US009631912B2

(12) United States Patent
Saito

(10) Patent No.: US 9,631,912 B2
(45) Date of Patent: Apr. 25, 2017

(54) MEASURING INSTRUMENT

(71) Applicant: MITUTOYO CORPORATION, Kawasaki, Kanagawa (JP)

(72) Inventor: Osamu Saito, Yokohama (JP)

(73) Assignee: MITUTOYO CORPORATION, Kawasaki (JP)

( * ) Notice: Subject to any disclaimer, the term of this patent is extended or adjusted under 35 U.S.C. 154(b) by 135 days.

(21) Appl. No.: 14/817,565

(22) Filed: Aug. 4, 2015

(65) Prior Publication Data
US 2016/0061574 A1    Mar. 3, 2016

(30) Foreign Application Priority Data
Aug. 27, 2014 (JP) .................. 2014-172808

(51) Int. Cl.
*G01B 3/20* (2006.01)
(52) U.S. Cl.
CPC .................... *G01B 3/205* (2013.01)
(58) Field of Classification Search
CPC ........................................................ G01B 3/20
USPC .................................................. 33/783, 811
See application file for complete search history.

(56) References Cited

U.S. PATENT DOCUMENTS

| 5,483,751 A * | 1/1996 | Kodato | G01B 3/20 33/794 |
| 8,353,111 B2 * | 1/2013 | Baldassari | B62K 23/04 33/1 PT |
| 2004/0118004 A1 * | 6/2004 | Hayashida | G01B 3/18 33/815 |
| 2005/0166413 A1 * | 8/2005 | Crampton | B25J 13/088 33/503 |
| 2005/0166416 A1 * | 8/2005 | Matsumiya | G01B 3/20 33/755 |
| 2009/0106994 A1 * | 4/2009 | Gomez | G01B 5/14 33/503 |
| 2014/0150272 A1 * | 6/2014 | Emtman | G01B 3/30 33/558.04 |
| 2014/0150570 A1 * | 6/2014 | Nahum | G01L 1/00 73/862.541 |
| 2015/0247717 A1 * | 9/2015 | Emtman | G01B 3/205 74/89 |

FOREIGN PATENT DOCUMENTS

| JP | H09-49721 A | 2/1997 |
| JP | 2000-155001 A | 6/2000 |

* cited by examiner

*Primary Examiner* — G. Bradley Bennett
(74) *Attorney, Agent, or Firm* — Oliff PLC

(57) ABSTRACT

A vernier caliper is a measuring instrument provided with a main scale and a slider that is slidably provided along a longitudinal direction of the main scale. The slider is provided with an operating part for a user to put his/her finger thereon so as to operate the same. The operating part is provided with a haptic notification means that notifies, through a haptic sense of the finger, that a predetermined measuring pressure has been reached by generating a resistance with respect to the finger by moving in association with the operation of the finger and by causing the resistance to change at a predetermined movement position.

7 Claims, 5 Drawing Sheets

MEASURING INSTRUMENT

CROSS-REFERENCE TO RELATED APPLICATION

This non-provisional application claims priority under 35 U.S.C. §119(a) from Japanese Patent Application No. 2014-172808, filed on Aug. 27, 2014, the entire contents of which are incorporated herein by reference.

BACKGROUND

Technical Field

The present invention relates to a measuring instrument provided with an operating part that is operated by a finger of a user.

Background Art

Conventionally, as a measuring instrument provided with an operating part that is operated by a finger of a user, a vernier caliper and a micrometer, or the like, are known. For example, when measuring the dimensions or the like of an object to be measured by means of a vernier caliper, a user puts his/her finger on an operating part of a slider, slides the slider by pushing or pulling the operating part, and abuts against measurement jaws between measurement sites of the object to be measured. Therefore, there is a disadvantage to the effect that variations in pressing force (measuring pressure) with respect to the object to be measured are likely to occur, and consequently errors in measurement values are also likely to occur.

Hence, as an example of a vernier caliper (measuring instrument) provided with a mechanism for stabilizing measuring pressure, those described in JP09-049721A and JP2000-155001A are proposed. The vernier calipers described in such documents are provided, separately from the slider, with a second slider that is slidable along a main scale and that is connected to the slider by means of a spring. By operating this second slider with a finger, an operating force, which is adjusted via the spring, is applied to the slider. The vernier caliper described in JP2000-155001A is provided with a lock mechanism that locks the movement of the second slider with respect to a main scale. It is attempted for measuring pressure to be stabilized by preventing a force that exceeds a predetermined operating force from being transmitted to the slider.

SUMMARY OF THE INVENTION

However, when a second slider, which is a separate body from the slider, is provided as in the conventional vernier calipers (measuring instruments), problems exist to the effect that the size of the measuring instrument becomes large and the mechanism becomes complex. In addition, a sense of operation derived from the finger operation of the second slider, which is detached from the slider, is different from that of a general measuring instrument, and thus, there is a problem to the effect that the usability is decreased.

An object of the present invention is to provide a measuring instrument which is capable of stabilizing the measuring pressure by means of a simple configuration without introducing an increase in the size and the complexity in the mechanism and which is capable of improving the operability by maintaining good usability.

The measuring instrument of the present invention is a measuring instrument comprising an operating part that is operated by a finger of a user, wherein the operating part is provided with a haptic notification mechanism that notifies, through a haptic sense of the finger, that a predetermined measuring pressure has been reached, by generating a resistance with respect to the finger by moving in association with the operation of the finger and by causing the resistance to change at a predetermined movement position.

According to such present invention, the measuring instrument is provided with an operating part, wherein the haptic notification mechanism of the operating part notifies that a predetermined measuring pressure has been reached by changing the resistance at a predetermined movement position, and thus, the user can know that the predetermined measuring pressure has been reached through a haptic sense of the finger in an intuitive and immediate manner, and therefore, the measuring pressure can be stabilized. In short, rather than through a sense of vision or a sense of hearing, the sensing can be made through the haptic sense of the finger operating the operating part, and thus, the operation can be made without being influenced by the surrounding environment (i.e. the luminance or noise) and the operability can be improved tremendously.

In addition, since the haptic notification mechanism is provided to the operating part of the measuring instrument, it is unnecessary to add a separate member such as a second slider, as in the conventional measuring instrument, and thus, there is no introduction of an increase in the size of the measuring instrument or an increase in the complexity of the mechanism. Moreover, it is possible to perform measurement with a sense of operation similar to that for the operating part of a general measuring instrument and to improve the operability even more by maintaining good usability.

According to the present invention, the haptic notification mechanism preferably provides a sense of clicking to the finger by abruptly changing the resistance between immediately prior to the operating part reaching the predetermined movement position and the operating part reaching the predetermined movement position.

Based on such configuration, the sense of clicking with respect to the finger is provided through an abrupt change in the resistance and the user can clearly know that the predetermined measuring pressure has been reached through such sense of clicking, and thus, the operability can further be improved and the measuring pressure can be even further stabilized.

According to the present invention, the haptic notification mechanism is preferably configured such that the haptic notification mechanism is capable of notifying that different measuring pressures, corresponding to the respective movement position, have been reached by changing the resistance at a plurality of movement positions of the operating part.

Based on such configuration, the user can select an appropriate measuring pressure and perform measurements by changing the resistance at a plurality of movement positions and by notifying that the respectively different measuring pressures have been reached. In short, depending on the conditions that influence the dimensions of the object to be measured, such as the material of the object to be measured, the atmospheric temperature at the measurement locations, or the like, an appropriate measuring pressure is set in advance, and the measurement accuracy can be improved by the user appropriately selecting a movement position of the operating part which corresponds to the measuring pressure.

According to the present invention, the measuring instrument is preferably a vernier caliper comprising a main scale having one jaw, a slider that is slidably provided on the main scale and that has the other jaw which is to be abutted against an object to be measured together with the one jaw, and the operating part that is provided on the slider and for sliding the slider.

Based on this configuration, the operating part having a haptic notification mechanism is provided to the slider in the vernier caliper and the slider can be caused to slide through the operation of the operating part by a finger. Thus, the operability can be improved by maintaining good usability without increasing the size of the vernier caliper. More particularly, in a vernier caliper, a typical method of use thereof is for the user to grip the main scale with his/her hand and slide the slider by putting a finger on part of the slider. Thus, in the present invention, good usability can be maintained since the operating part for sliding the slider is provided on part of the slider.

According to the present invention, the haptic notification mechanism is preferably configured by: a movement member that has a part for the user to put the finger thereon and that is movably provided on the slider; a biasing part that generates the resistance, in association with the movement of the movement member, by biasing the movement member; and a resistance change part that changes the resistance by making contact with the movement member.

Based on this configuration, since the haptic notification mechanism has the movement member, the biasing part and the resistance change part, resistance in association with the movement of the movement member is generated by the biasing part and the resistance change part changes the resistance by making contact with the movement member, and thus, the user who operates the operating part by putting his/her finger on the part for putting the finger of the movement member can be accurately notified of the fact that the predetermined measuring pressure has been reached.

According to the present invention, preferably, the resistance change part is configured by a sliding contact spring that makes sliding-contact with the movement member, and one of the movement member and the sliding contact spring is formed with a projection that projects to the other one of the movement member and the sliding contact spring, the other one of the movement member and the sliding contact spring being formed with an abutting part which abut against the projection, a sense of clicking being provided to the finger by the abutting part going over the projection to abruptly change the resistance.

Based on this configuration, at the sliding contact spring between the movement member and the resistance change part, the projections of one of the movement member and the resistance change part and the abutting part on the other of the movement member and the resistance change part abut against each other, and by providing a sense of clicking to the finger by the abutting part going over the projections, the user can be clearly notified of the fact that the predetermined measuring pressure has been reached and the measuring pressure can be stabilized.

According to the present invention, preferably, the movement member is provided such that the movement member is capable of moving in a first direction and a second direction corresponding to directions in which the slider slides along the main scale, the biasing part has a first biasing part that biases the movement member moving in the first direction and a second biasing part that biases the movement member in the second direction, and the resistance change part is configured such that the resistance change part is capable of changing the resistance by making contact with the movement member moving in the respective directions of the first direction and the second direction.

Based on this configuration, the movement member is movable in the first direction and the second direction in a corresponding manner to the sliding of the slider. The biasing part has a first biasing part and a second biasing part respectively corresponding to the first direction and the second direction. The resistance change part changes the resistance in each of the first direction and the second direction, and thus, the measuring pressure can be stabilized for the respective sliding directions of the slider.

DETAILED DESCRIPTION OF THE EMBODIMENTS

Hereinafter, an embodiment of the present invention will be described based on the drawings.

Figure 1:
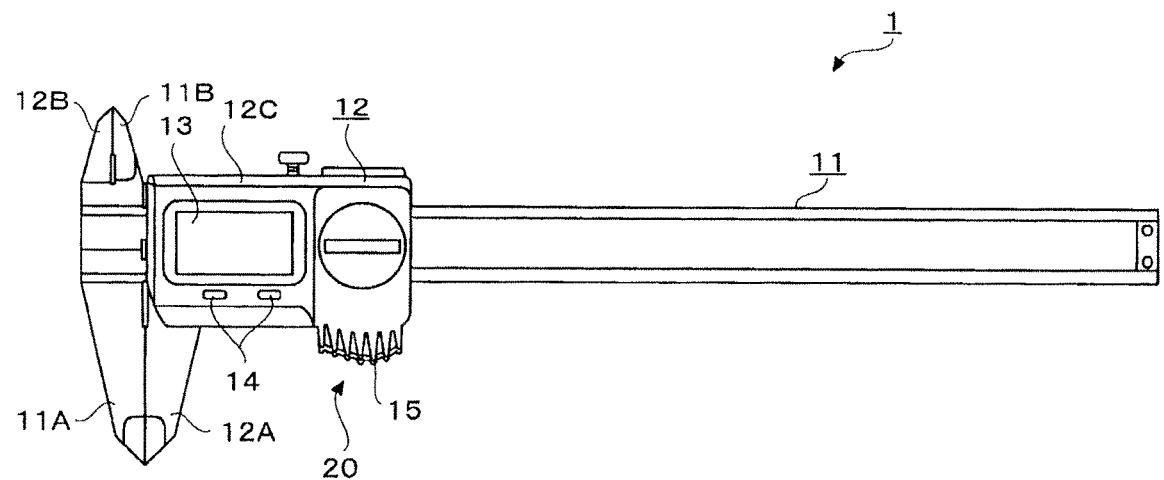
FIG. 1 is a front view of a vernier caliper according to an embodiment of the present invention.

FIG. 1 is a front view of a vernier caliper according to an embodiment of the present invention.

As shown in FIG. 1, a vernier caliper 1 is a digital-representation type measuring instrument provided with: a main scale 11 formed in a rectangular plate shape; and a slider 12 slidably provided along a longitudinal direction of the main scale 11.

It should be noted that, in the description below, the longitudinal direction of the main scale 11 will be considered as the right-and-left direction of FIG. 1 and the side on which the slider 12 is will be considered as the left hand side of FIG. 1. In addition, the direction orthogonal to the longitudinal direction of the main scale 11 will be considered as the up-and-down direction of FIG. 1.

The main scale 11 is provided with: an outer measurement jaw 11A (the lower side of FIG. 1), which is formed at an end in the longitudinal direction; and an inner measurement jaw 11B (the upper side of FIG. 1), which is formed on the opposite side of the outer measurement jaw 11A so as to sandwich the main scale 11 therebetween. On the front face of the main scale 11, main scale marks are provided (the marks are omitted in the drawing).

The slider 12 is provided with: an outer measurement jaw 12A, which is provided in a corresponding manner to the outer measurement jaw 11A; and an inner measurement jaw 12B, which is provided in a corresponding manner to the inner measurement jaw 11B.

In addition, the slider 12 is provided with: a display part 13 provided on the front face; a plurality of mechanical switches 14 provided about the display part 13; and an operating part 15 provided next to the display part 13.

The display part 13 displays measurement information or the like by means of a display device such as a liquid crystal display or the like. The switches 14 are operated in order to switch the information to be displayed on the display part 13.

Figure 2:
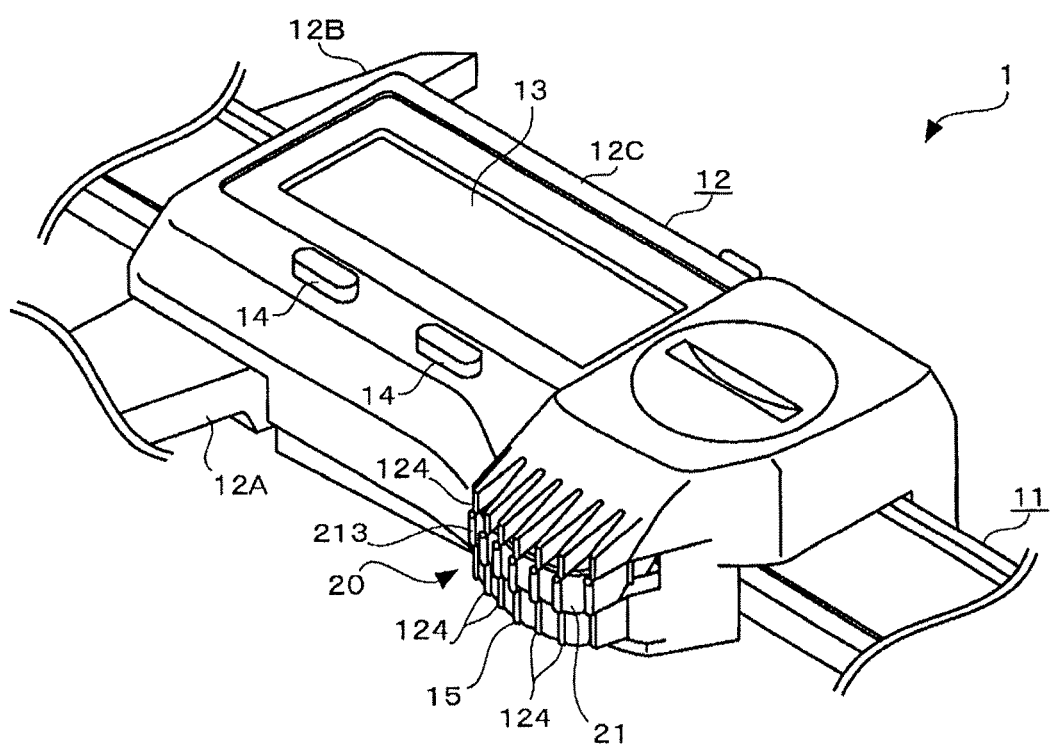
FIG. 2 is a perspective view illustrating a slider of the vernier caliper.
Figure 3:
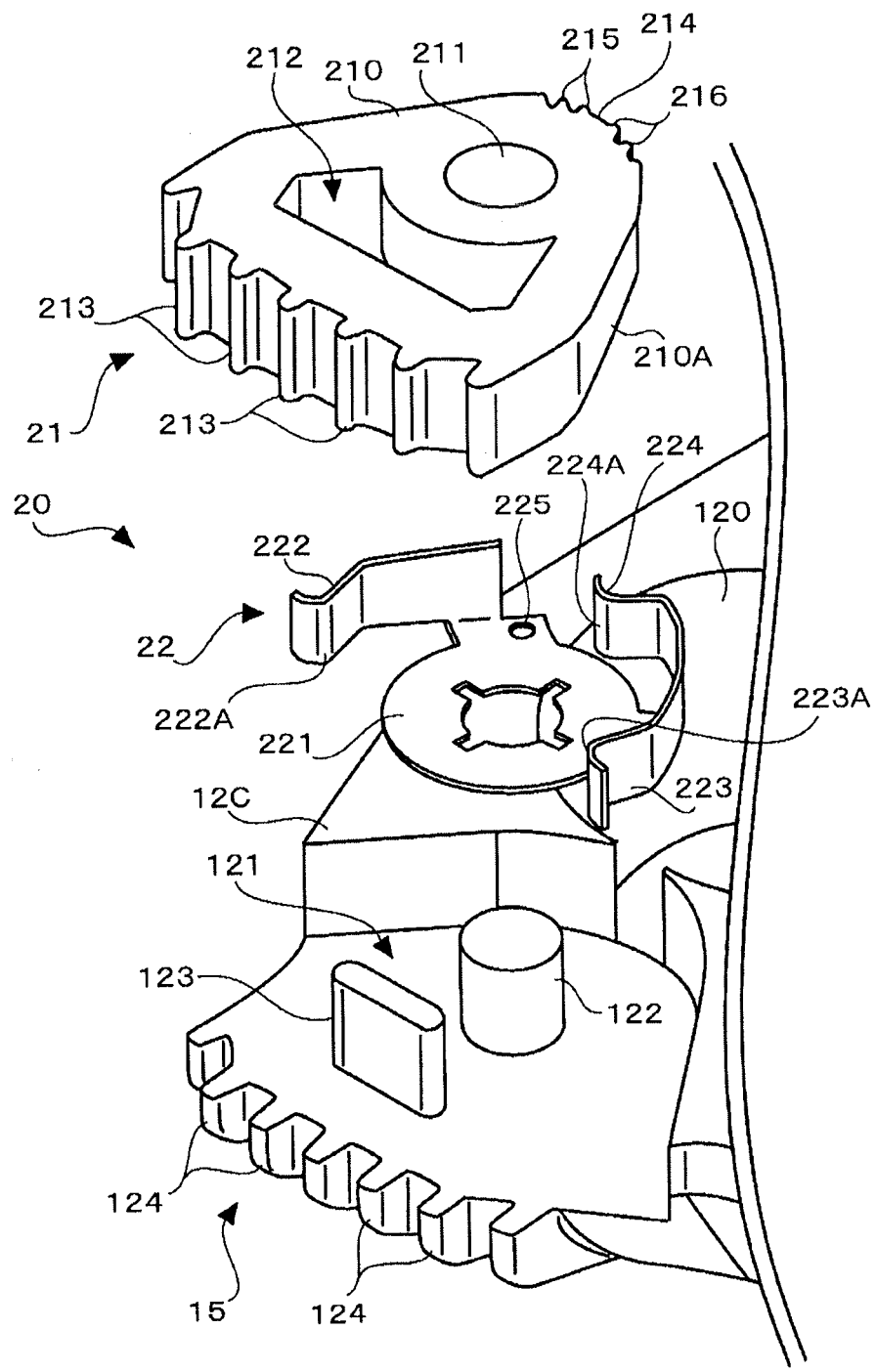
FIG. 3 is an exploded perspective view illustrating an operating part provided to the slider.

FIG. 2 is a perspective view illustrating the slider 12 and FIG. 3 is an exploded perspective view illustrating the operating part 15 provided on the slider 12. It should be noted that FIG. 3 is an exploded perspective view in which the slider 12 shown in FIGS. 1 and 2 is dissolved and the top and bottom sides are inverted and in which the left and right sides in FIG. 3 (and FIGS. 4 and 5, which are described below) are inverted with respect to the situation shown in FIGS. 1 and 2.

The slider 12 is provided with a square tube-shaped slider body 12C which is slidably provided on the main scale 11. On the slider body 12C, the operating part 15 and a battery receiving part 120 (FIG. 3) for receiving a button battery are provided.

The operating part 15 is provided on an end which is on the opposite side (the right hand side in FIG. 1) of the outer measurement jaw 12A and the inner measurement jaw 12B, in the longitudinal direction of the main scale 11, with the display part 13 sandwiched therebetween. In the direction orthogonal to the longitudinal direction of the main scale 11, the operating part 15 is provided such that it projects to the same side as that of the outer measurement jaw 12A (the lower side of FIG. 1). The operating part 15 is a site for a user to put his/her finger for operation when sliding the slider 12 along the longitudinal direction of the main scale 11.

Such vernier caliper 1 is capable of measuring the outside length of the object to be measured by putting the finger on the operating part 15 to slide the slider 12 with respect to the main scale 11 and abutting the outer measurement jaws 11A, 12A against the outside of the object to be measured. In addition, the vernier caliper 1 is capable of measuring the inside length of the object to be measured by abutting the inner measurement jaws 11B, 12B against the inside of the object to be measured. Then, the vernier caliper 1 displays information such as measurement values obtained through measurement of the object to be measured on the display part 13.

Figure 4:
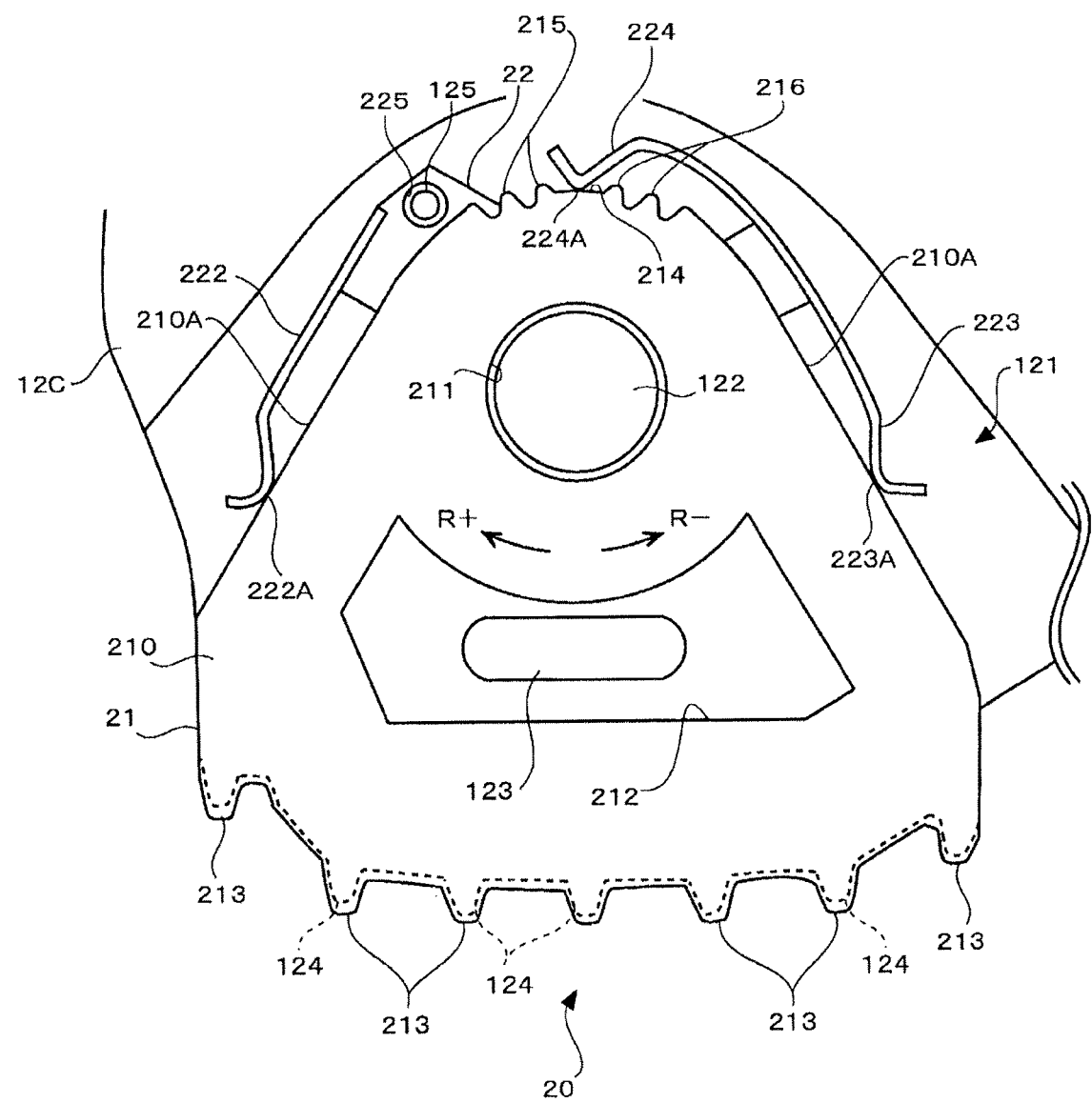
FIG. 4 is a plan view illustrating a haptic notification means in the operating part.

FIG. 4 is a plan view illustrating a haptic notification means 20 in the operating part 15.

The operating part 15 is provided with the haptic notification means 20 that notifies, through a haptic sense of the finger, that the measuring pressure acting on the object to be measured from each of the outer measurement jaws 11A, 12A and the inner measurement jaws 11B, 12B has reached a predetermined value when abutting the outer measurement jaws 11A, 12A or the inner measurement jaws 11B, 12B against the object to be measured.

The haptic notification means 20 is provided with: a turning member 21 which is a movement member formed with a plurality of projections 213, wherein such projections are formed as a part for a user to put his/her finger on; and a biasing member 22 which generates resistance in association with the operation by biasing the turning member 21. The haptic notification means 20 notifies the user, through a haptic sense of the finger, of the fact that a predetermined measuring pressure has been reached through a change in resistance received from the biasing member 22 in association with the turning (movement) of the turning member 21.

The slider body 120 being provided with the operating part 15 is provided with: a receiving part 121 that receives the turning member 21 therein; a support shaft 122, which is a supporting part for turnably supporting the turning member 21; and a restriction part 123 that restricts the turning angle of the turning member 21. Moreover, the slider body 12C is formed with a plurality of projections 124 which correspond to the projections 213 of the turning member 21. Furthermore, on the bottom surface of the receiving part 121, a positioning projection 125 (FIG. 4) is formed for positioning the biasing member 22.

The turning member 21 is provided with a turning member body 210, which in general has a fan shape. The turning member body 210 is formed with: a shaft insertion hole 211 through which the support shaft 122 is inserted; a restriction hole 212 through which the restriction part 123 is inserted; and a plurality of projections 213. The turning member 21 is turnably supported around the support shaft 122 and is turnable in two directions, i.e. a first direction (the direction shown with an arrow R+ in FIG. 4) and a second direction (the direction shown with an arrow R− in FIG. 4). When the turning member 21 turns in the respective directions, the turning angle of the turning member 21 is restricted by the restriction part 123 abutting against the inner surface of the restricted hole 212.

The biasing member 22 is a one-piece part formed by punching and bending a plate spring material. The biasing member 22 is provided with: a generally disc-shaped base part 221; a first biasing part 222 that rises up from one side of the base part 221; a second biasing part 223 that rises up from the other side of the base part 221; and a sliding contact spring part 224, which is provided in a continuous manner on the second biasing part 223 on a base end side thereof. By inserting the support shaft 122 through the insertion hole provided at the center of the base part 221, while inserting the positioning projection 125 through a positioning hole 225 provided at a position eccentric from the center of the base part 221, the biasing member 22 is attached to the receiving part 121 of the slider body 12C such that turning thereof is impossible.

The first biasing part 222 extends, in an opposed manner, to a side surface part 210A on one side of the turning member body 210 and is formed with an abutting part 222A, on the tip side thereof, which curves toward the support shaft 122 and abuts against the side surface part 210A on the one side. The second biasing part 223 extends, in an opposed manner, to a side surface part 210A on the other side of the turning member body 210 and is formed with an abutting part 223A, on the tip side thereof, which curves toward the support shaft 122 and abuts against the side surface part 210A on the other side. Each of the first biasing part 222 and the second biasing part 223 makes the respective abutting part 222A, 223A abut against the side surface parts 210A of the turning member body 210 and allows a biasing force for sandwiching and pressing the turning member body 210 from both sides to act on the turning member 21.

Such first biasing part 222 and second biasing part 223 generate resistance in association with the turning of the turning member 21. In particular, when the turning member 21 is turned in the first direction (i.e. the direction shown with an arrow R+ in FIG. 4), the biasing force acting on the side surface part 210A of the turning member body 210 from the abutting part 222A increases, whereas the biasing force from the abutting part 223A decreases. Accordingly, the resistance in the direction that returns the turning of the turning member 21 is generated by the first biasing part 222, and this resistance gradually increases in association with the turning of the turning member 21. On the other hand, when the turning member 21 is turned in the second direction (i.e. the direction shown with an arrow R− in FIG. 4), the resistance in the direction that returns the turning of the turning member 21 is gradually increased by the second biasing part 223.

The sliding contact spring part 224 extends to the back surface side of the turning member body 210 (i.e. to the side opposite to the plurality of projections 213, which are a part for putting the finger, with the support shaft 122 sandwiched therebetween) and is formed with an abutting part 224A, on the tip side thereof, which curves toward the support shaft 122 and abuts against the back surface part of the turning member body 210. On the other hand, the back surface part of the turning member body 210 is formed with: a flat part 214 that conforms to a concentric circle centered at the support shaft 122; a plurality of first projections 215 arranged next to each other on one side of the flat part 214 on the concentric circle; and a plurality of second projections 216 arranged next to each other on the other side of the flat part 214 on the concentric circle.

The sliding contact spring part 224 presses the flat part 214 of the turning member body 210 while abutting the abutting part 224A against the flat part 214 thereof. In addition, in association with the turning of the turning member 21, the abutting part 224A makes sliding-contact with the flat part 214, and abuts against and goes over the first projections 215 or the second projections 216. When such abutting part 224A goes over the first projections 215 or the second projections 216, the sliding-contact resistance between the abutting part 224A and the turning member body 210 changes. More specifically, a resistance changing part that changes the resistance at the time of turning the turning member 21 is configured by the abutting part 224A of the sliding contact spring part 224, the first projections 215 and the second projections 216, wherein the resistance changing part changes the resistance when the turning member 21 is turned.

In addition, when the abutting part 224A goes over the first projections 215 or the second projections 216, since the abutting part 224A first abuts against the first projections 215 or the second projections 216, the sliding contact resistance increases in a rapid manner. Then, until the abutting part 224A reaches the apexes of the first projections 215 or the second projections 216, the sliding contact resistance increases in a continuous manner. Thereafter, when the abutting part 224A passes the apexes of the first projections 215 or the second projections 216, the sliding contact resistance decreases. In this way, by abruptly changing the sliding contact resistance when the abutting part 224A goes over the first projections 215 or the second projections 216, the resistance change part provides a clicking sense to the finger of the user operating the turning member 21.

Figure 5:
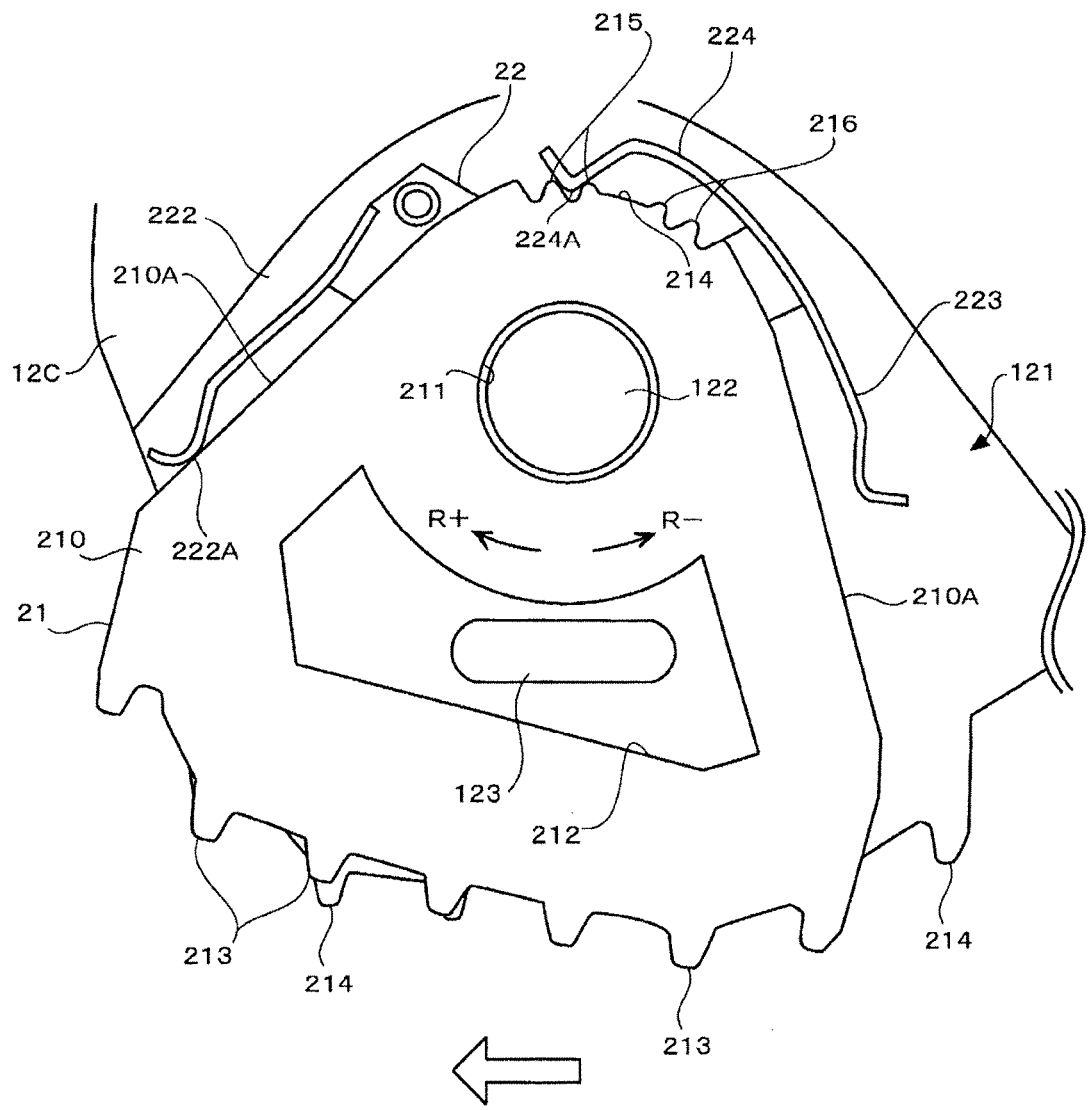
FIG. 5 is a front view illustrating one behavior of the haptic notification means.

FIG. 5 is a front view illustrating one behavior of the haptic notification means 20.

As for the one behavior of the haptic notification means 20 shown in FIG. 5, a behavior at the time of measuring the inner length of the object to be measured is provided in which the inner measurement jaw 12B of the slider 12 is drawn apart from the inner measurement jaw 11B of the main scale 11, i.e. the slider 12 is caused to slide toward the right hand side of FIG. 1. In this measurement behavior, the user puts his/her finger on the plurality of projections 213 of the turning member 21, which are the part for putting the finger, and the plurality of projections 124 of the slider body 12C, so as to apply force in the direction shown in FIG. 5 with an outlined arrow and to cause the slider 12 to slide. When the inner measurement jaws 11B, 12B abut against the object to be measured, the sliding of the slider 12 stops and the turning member 21 turns with respect to the slider body 12C.

As shown in FIG. 5, when the turning member 21 turns in the first direction (i.e. in the direction shown with an arrow R+ in FIG. 5), the side surface part 210A of the turning member body 210 moves to the left hand side of FIG. 5, and the side surface part 210A presses the abutting part 222A and causes the first biasing part 222 to warp. In this way, the biasing force from the first biasing part 222 increases, a reactive force acts upon the turning member body 210 from the abutting part 222A, and the resistance in the direction that returns the turning of the turning member 21 (i.e. the second direction shown with an arrow R− in FIG. 5) gradually increases. On the other hand, the biasing force with which the abutting part 223A presses the turning member body 210 decreases by the side surface part 210A of the turning member body 210 moving in the direction drawing apart from the abutting part 223A of the second biasing part 223, and in due course, the abutting part 223A and the side surface part 210A are separated.

In resistance to such biasing force of the first biasing part 222, when the turning member 21 further turns in the first direction, the abutting part 224A of the sliding contact spring part 224 abuts against a first one of the first projections 215 next to the flat part 214, the sliding contact resistance from the sliding contact spring part 224 is added to the resistance by the first biasing part 222, and the increased resistance is transmitted to the finger of the user. In addition, when the turning member 21 turns and the abutment part 224A of the sliding contact spring part 224 goes over the first projections 215, the sense of clicking is transmitted to the finger of the user by a decrease in the sliding contact resistance after a rapid increase thereof. By means of the first sense of clicking at the time of going over the first one of the first projections 215, the haptic notification means 20 notifies that a first measuring pressure among the predetermined measuring pressures has been reached, through a haptic sense of the finger.

When the turning member 21 further turns in the first direction after the abutting part 224A of the sliding contact spring part 224 goes over the first one of the first projections 215, a second sense of clicking is transmitted to the finger of the user by the abutting part 224A going over a second one of the first projections 215 and the haptic notification means 20 notifies that a second measuring pressure among the predetermined measuring pressures has been reached. When the turning member 21 is further turned in the first direction after the abutting part 224A goes over the second one of the first projections 215, the restriction part 123 of the slider body 12C abuts against the inner surface of the restriction hole 212 of the turning member body 210, and it is notified that further turning of the turning member 21 is not possible. When the measurement is completed and the user releases his/her finger from the turning member 21, the turning member 21 is restored to the original position shown in FIG. 3 due to the biasing force of the first biasing part 222.

Figure 6:
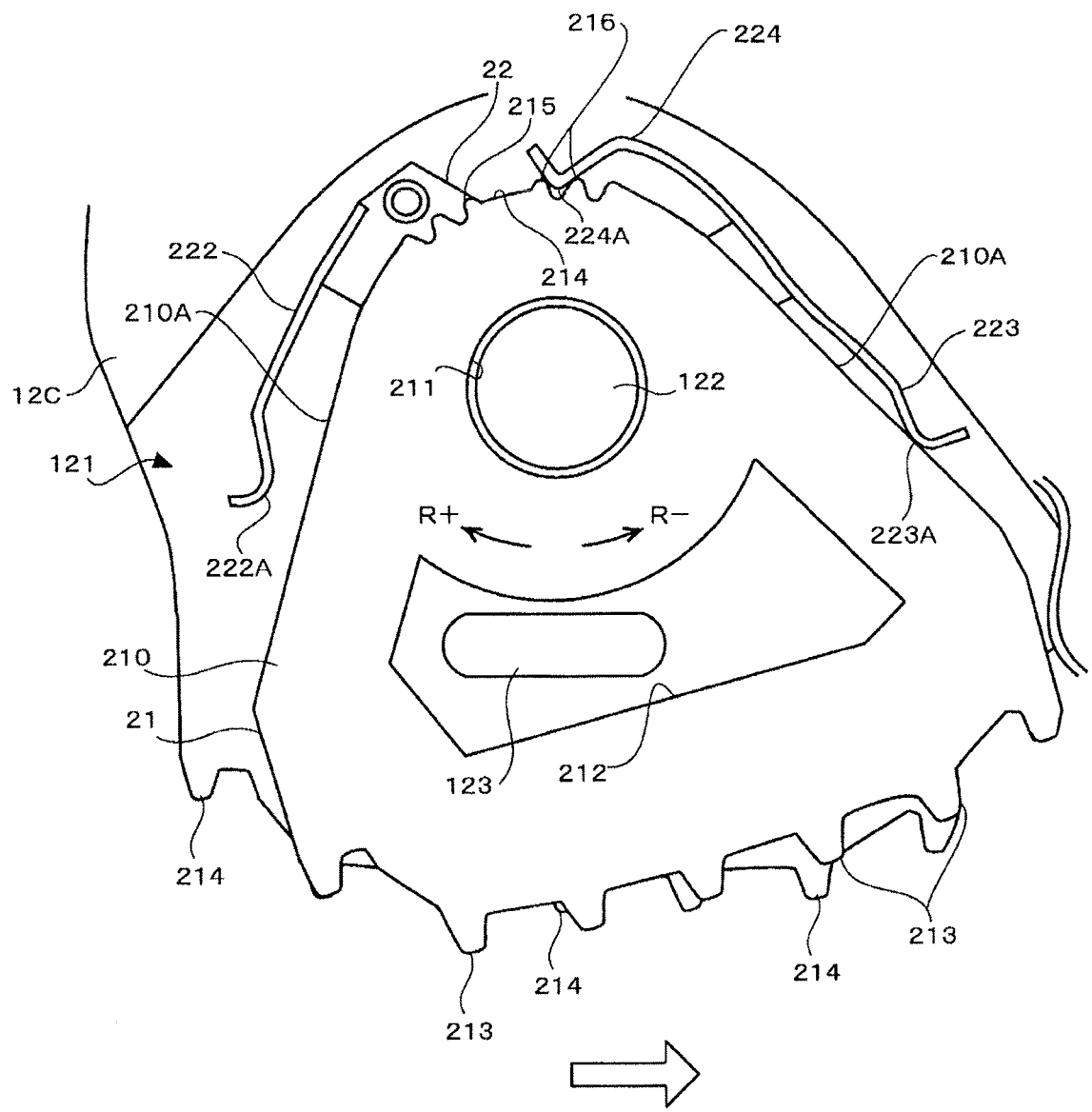
FIG. 6 is a front view illustrating another behavior of the haptic notification means.

FIG. 6 is a front view illustrating another behavior of the haptic notification means 20.

As for the another behavior of the haptic notification means 20 shown in FIG. 6, a behavior at the time of measuring the outer length of the object to be measured is provided in which the outer measurement jaw 12A of the slider 12 approaches the outer measurement jaw 11A of the main scale 11, i.e. the slider 12 is caused to slide toward the left hand side of FIG. 1. In this measurement behavior, the user puts his/her finger on the plurality of projections 213, 124 of the turning member 21 and the slider body 12C, so as to apply force in the direction shown in FIG. 6 with an outlined arrow and to cause the slider 12 to slide. When the outer measurement jaws 11A, 12A abut against the object to be measured, the sliding of the slider 12 stops and the turning member 21 turns with respect to the slider body 12C.

As shown in FIG. 6, when the turning member 21 turns in the second direction (i.e. in the direction shown with an arrow R− in FIG. 6), the second biasing part 223 warps and the biasing force thereof increases, and the resistance in the direction that returns the turning of the turning member 21 (i.e. the first direction shown with an arrow R+ in FIG. 6) with a reactive force from the abutting part 223A gradually increases. On the other hand, the biasing force of the first biasing part 222 decreases. In addition, when the turning member 21 turns in the second direction, the abutting part 224A of the sliding contact spring part 224 abuts against a first one of the second projections 216 next to the flat part 214, the increased slide contacting resistance is transmitted to the finger of the user, and when the abutting part 224A goes over the second projections 216, a sense of clicking is transmitted to the finger of the user. By means of the first sense of clicking, the haptic notification means 20 notifies that a first measuring pressure among the predetermined measuring pressures has been reached, through a haptic sense of the finger.

When the turning member 21 further turns in the second direction, a second sense of clicking is transmitted to the finger of the user by the abutting part 224A going over a second one of the second projections 216 and the haptic notification means 20 notifies that a second measuring pressure among the predetermined measuring pressures has been reached. When the turning member 21 is further turned in the second direction after the abutting part 224A goes over the second one of the second projections 216, the restriction part 123 of the slider body 12C abuts against the inner surface of the restriction hole 212 of the turning member body 210, and it is notified that further turning of the turning member 21 is not possible. When the measurement is completed and the user releases his/her finger from the turning member 21, the turning member 21 is restored to the original position shown in FIG. 4 due to the biasing force of the second biasing part 223.

According to the above-described embodiments, the following operational effects and effects can be obtained:

(1) As the haptic notification means 20 is provided to the operating part 15 of the vernier caliper 1 and as the user is notified of the fact that the predetermined measuring pressure has been reached, through a haptic sense of the finger, based on the change in resistance when turning the turning member 21 of such haptic notification means 20, it is possible to know that the predetermined pressure has been reached in an intuitive and immediate manner and thus, the measuring pressure can be stabilized.

(2) On this occasion, the haptic notification means 20 makes a notification through a haptic sense of a finger operating the operating part 15, rather than through a sense of vision or a sense of hearing, and thus, the user can know that the predetermined measuring pressure has been reached without being influenced by the surrounding environment (for example, even if in a dark place or a noisy environment), and therefore, the operability can be improved tremendously.

(3) As the vernier caliper 1 is provided with the haptic notification means 20 at the operating part 15 of the slider 12, which is a general operating part thereof, it is not necessary to add a member separate from the slider 12 and thus, there is no introduction of an increase in the size of the vernier caliper 1 or an increase in the complexity of the mechanism. In addition, by operating the operating part 15, it is possible to perform measurement with a sense of operation similar to that for the operating part of a general vernier caliper and to improve the operability even more by maintaining good usability.

(4) The haptic notification means 20 is provided with a resistance change part which is configured by: an abutting part 224A of the sliding contact spring part 224; and the first projections 215 and the second projections 216 of the turning member 21. Since a sense of clicking can be provided to the finger by this resistance change part, it is possible to clearly know that the predetermined measuring pressure has been reached and thus, the operability can be further improved and the measuring pressure can be further stabilized.

(5) The haptic notification means 20 is provided with two of each of the first projections 215 and the second projections 216. By the abutting part 224A of the sliding contact spring part 224 going over these projections 215, 216, a sense of clicking can be transmitted to the finger of the user at two locations. Each sense of clicking can notify that the first and second measuring pressures, which are different from each other, have been reached. Accordingly, the user can select an appropriate measuring pressure and perform measurements and thus, the measurement accuracy can be improved.

(6) At the time of measurement in the respective sliding directions of the slider 12, in correspondence with the turning of the turning member 21 in the first direction and the second direction, each of the first biasing part 222 and the second biasing part 223 bias the turning member 21, and the sliding contact resistance of the first projections 215 and the second projections 216 with respect to the sliding contact spring part 224 changes. In this way, for the respective sliding directions of the slider, the haptic notification means 20 notifies that the predetermined measuring pressure has been reached and thus, the measurement accuracy can be improved while stabilizing the measuring pressures in the respective directions.

[Embodiment Variations]

It should be noted that the present invention is not limited to the above-described embodiments and any variations, improvements or the like within the scope in which the object of the present invention can be achieved are included in the present invention.

For example, in the above-described embodiments, the vernier caliper 1 is illustrated as a measuring instrument; however, any other measuring instrument such as a micrometer or the like may be used. Here, as for the micrometer, micrometers such as those provided with a thimble for advancing/retreating a spindle, wherein the thimble is provided with a ratchet mechanism, are known. However, for example, instead of the ratchet mechanism, it is sufficient to provide the above-described haptic notification means. In short, the measuring instrument of the present invention suffices as long as the operating part is provided with a haptic notification means that notifies, through a haptic sense of the finger, that the predetermined measuring pressure has been reached.

In the above-described embodiments, the turning member 21 which is turnably supported on the slider body 12C is used as a movement member in the haptic notification means; however, such movement member may be provided in a direction the same as the sliding direction of the slider, such that it can be freely advanced or retreated.

In the above-described embodiments, a plurality of projections 124 corresponding to the projections 213 of the turning member 21 are formed in the slider body 12C; however, the numbers of such projections need not be the same, and the projections 124 may not be provided on the side of the slider body 12C. In the measurement in the configuration not being provided with the provision of the projections 124, the user may put his/her finger on the plurality of projections 213, which is the part for putting the finger of the turning member 21 so as to slide the slider 12.

In the above-described embodiments, the first biasing part 222, the second biasing part 223 and the sliding contact spring part 224 of the biasing member 22 formed from a plate spring material were used as the biasing part and the resistance change part in the haptic notification means; however, such biasing part and resistance change part may be configured with alternative members. In addition, the biasing part is not limited to one configured with a plate spring, but may also be configured with any flexible member such as a helical spring, rubber, sponge or the like.

In the above-described embodiments, the first projections 215 and the second projections 216 of the turning member 21 and the sliding contact spring part 224 of the biasing member 22 are used as the resistance change part in the haptic notification means, and a configuration is employed in which the sliding contact resistance between them is changed; however, the present invention is not limited thereto and the configuration of the resistance change part is not particularly limited as long as the resistance by the biasing force of the biasing part (i.e. the first biasing part 222 or the second biasing part 223) is changed.

In the above-described embodiments, the resistance change part of the haptic notification means provides a sense of clicking by the abutting part 224A of the sliding contact spring part 224 going over the first projections 215 and the second projections 216 of the turning member 21; however, the configuration is not limited to the provision of the sense of clicking and it may simply increase the resistance.

In the above-described embodiments, the turning member 21 of the haptic notification means is provided with two projections from each of the first projections 215 and the second projections 216; however, the number of such projections is not particularly limited and it may be one, or three or more.

INDUSTRIAL APPLICABILITY

As described above, the present invention can be suitably utilized in a measuring instrument provided with an operating part which is operated by a finger of a user.

What is claimed is:

1. A measuring instrument comprising an operating part that is operated by a finger of a user, wherein
the operating part is provided with a haptic notification mechanism that notifies, through a haptic sense of the finger, that a predetermined measuring pressure has been reached, by generating a resistance with respect to the finger by moving in association with the operation of the finger and by causing the resistance to change at a predetermined movement position.

2. The measuring instrument according to claim 1, wherein
the haptic notification mechanism provides a sense of clicking to the finger by abruptly changing the resistance between immediately prior to the operating part reaching the predetermined movement position and the operating part reaching the predetermined movement position.

3. The measuring instrument according to claim 1, wherein
the haptic notification mechanism is configured such that the haptic notification mechanism is capable of notifying that different measuring pressures, corresponding to the respective movement position, have been reached by changing the resistance at a plurality of movement positions of the operating part.

4. The measuring instrument according to claim 1, wherein
the measuring instrument is a vernier caliper comprising a main scale having one jaw, a slider that is slidably provided on the main scale and that has the other jaw which is to be abutted against an object to be measured together with the one jaw, and the operating part that is provided on the slider and for sliding the slider.

5. The measuring instrument according to claim 4, wherein
the haptic notification mechanism is configured by: a movement member that has a part for the user to put the finger thereon and that is movably provided on the slider; a biasing part that generates the resistance, in association with the movement of the movement member, by biasing the movement member; and a resistance change part that changes the resistance by making contact with the movement member.

6. The measuring instrument according to claim 5, wherein
the resistance change part is configured by a sliding contact spring that makes sliding-contact with the movement member, and
one of the movement member and the sliding contact spring is formed with a projection that projects to the other one of the movement member and the sliding contact spring, the other one of the movement member and the sliding contact spring being formed with an abutting part which abut against the projection, a sense of clicking being provided to the finger by the abutting part going over the projection to abruptly change the resistance.

7. The measuring instrument according to claim 5, wherein
the movement member is provided such that the movement member is capable of moving in a first direction and a second direction corresponding to directions in which the slider slides along the main scale,
the biasing part has a first biasing part that biases the movement member moving in the first direction and a second biasing part that biases the movement member in the second direction, and
the resistance change part is configured such that the resistance change part is capable of changing the resistance by making contact with the movement member moving in the respective directions of the first direction and the second direction.

* * * * *